United States Patent
Shimizu (10) Patent No.: US 10,890,568 B2
(45) Date of Patent: Jan. 12, 2021

(54) GAS CHROMATOGRAPH

(71) Applicant: Shimadzu Corporation, Kyoto (JP)

(72) Inventor: Kazunori Shimizu, Kyoto (JP)

(73) Assignee: Shimadzu Corporation, Kyoto (JP)

(*) Notice: Subject to any disclaimer, the term of this patent is extended or adjusted under 35 U.S.C. 154(b) by 225 days.

(21) Appl. No.: 15/928,282

(22) Filed: Mar. 22, 2018

(65) Prior Publication Data

US 2019/0293616 A1   Sep. 26, 2019

(51) Int. Cl.
| | |
|---|---|
| *G01N 30/02* | (2006.01) |
| *G01N 30/88* | (2006.01) |
| *G06F 11/32* | (2006.01) |
| *G05B 23/02* | (2006.01) |

(52) U.S. Cl.
CPC ......... *G01N 30/88* (2013.01); *G05B 23/0259* (2013.01); *G06F 11/328* (2013.01); *G01N 2030/025* (2013.01); *G01N 2030/889* (2013.01)

(58) Field of Classification Search
CPC ............ G05B 23/0259; G05B 23/0262; G05B 23/0264; G05B 23/0267; G05B 23/027; G05B 23/0272; G05B 23/0275; G05B 23/0278; G05B 23/0281; G05B 23/0283; G05B 23/0286; G05B 23/0289; G05B 23/0291; G05B 23/0294; G05B 23/0297; G01N 33/0063
See application file for complete search history.

(56) References Cited

U.S. PATENT DOCUMENTS

| | | | |
|---|---|---|---|
| 2007/0150785 A1 | 6/2007 | Munetaka | |
| 2019/0079107 A1* | 3/2019 | Kaneko | ............ G01N 35/00722 |

FOREIGN PATENT DOCUMENTS

| | | | |
|---|---|---|---|
| JP | 4631687 B2 | | 6/2007 |
| JP | 2017030662 A | * | 2/2017 |
| JP | 2019017251 A | * | 2/2019 |

* cited by examiner

*Primary Examiner* — Herbert K Roberts
(74) *Attorney, Agent, or Firm* — Maier & Maier, PLLC (57) ABSTRACT

Where an abnormal state is detected, an abnormality notification screen to that effect is displayed on a display unit. The abnormality notification screen is non-displayed in a case where hold of the abnormal state is selected in a state where the abnormality notification screen is displayed on the display unit. Where a warning icon is displayed on the display unit to indicate the detection of the abnormal state and the warning icon is selected, the abnormality notification screen is redisplayed on the display unit. The abnormality notification screen is not redisplayed on the display unit until the warning icon is selected after the abnormal state is held and the abnormality notification screen becomes non-displayed. Accordingly, the abnormal state can be confirmed by the warning icon being selected when necessary without the work that is performed by a worker being interrupted by redisplay of the abnormality notification screen.

7 Claims, 7 Drawing Sheets

GAS CHROMATOGRAPH

FIELD

The present invention relates to a gas chromatograph and, more particularly, to display control with respect to a display unit of a gas chromatograph.

BACKGROUND

In a case where an abnormal state occurs in an analysis device, a worker may be notified of the occurrence of the abnormal state by the occurrence of the abnormal state being displayed on a display unit (see, for example, Patent Literature 1 below). In a gas chromatograph, in particular, an abnormality attributable to leakage of various gases such as a carrier gas (gas leak abnormality), an abnormality attributable to the temperature of each portion such as a sample vaporization chamber, a column, and a detector exceeding a specified value (temperature abnormality), and so on arise in some cases.

In a case where the abnormal state is detected, an abnormality notification screen to that effect is displayed on a display unit. In this case, the abnormality notification screen includes, for example, a hold button and a release button and a worker can select any one of the buttons. Although the abnormality notification screen is non-displayed in a case where the hold button is selected, the abnormality notification screen is redisplayed on the display unit after a predetermined time has elapsed.

By selecting the hold button as described above, the worker can proceed with the work performed at that time, and the worker does not forget that the abnormal state has occurred as the abnormality notification screen is redisplayed after the elapse of a predetermined time. The worker can release the abnormal state and return to normal control by selecting the release button after confirming the abnormal state and coping with the abnormal state at any timing.

[Patent Literature 1] Japanese Patent No. 4631687

SUMMARY

Technical Problem

In the related art as described above, however, the work that is performed by the worker is interrupted by the abnormality notification screen being redisplayed.

Especially in a case where the worker performs the work over an extended period of time while confirming the display on the display unit, the abnormality notification screen is redisplayed on the display unit over and over, and thus the worker's workability may be reduced.

In addition, once the abnormality notification screen is temporarily non-displayed by the hold button being selected, the abnormality notification screen is not displayed on the display unit until a predetermined time elapses thereafter. Accordingly, in a case where the worker wishes to confirm the content of the abnormal state, an operation for display screen transition should be performed, and then the work becomes complicated.

Furthermore, when the worker leaves the gas chromatograph to confirm and cope with the abnormal state after confirming the abnormality notification screen, the abnormality notification screen may be automatically redisplayed in the absence of the worker. In this case, another worker confirming the redisplayed abnormality notification screen may confirm and cope with the abnormal state, and then useless work may be performed.

The present invention has been made in view of the above circumstances, and an object thereof is to provide a gas chromatograph with which a worker's workability can be improved. Another object of the present invention is to provide a gas chromatograph with which a worker can be prevented from performing useless work.

A gas chromatograph according to the present invention includes a display unit, an input reception processing unit, an abnormality detection processing unit, an abnormality display processing unit, an abnormality non-display processing unit, a symbol display processing unit, and an abnormality redisplay processing unit. The input reception processing unit receives an input operation with respect to a screen displayed on the display unit. The abnormality detection processing unit detects an abnormal state. The abnormality display processing unit displays an abnormality notification screen indicating abnormal state detection on the display unit in a case where the abnormal state is detected. The abnormality non-display processing unit non-displays the abnormality notification screen in a case where selection of hold of the abnormal state is received by the input reception processing unit in a state where the abnormality notification screen is displayed on the display unit. The symbol display processing unit displays a symbol indicating the abnormal state detection on the display unit. The abnormality redisplay processing unit redisplays the abnormality notification screen on the display unit in a case where selection of the symbol is received by the input reception processing unit after the abnormality notification screen is non-displayed by the abnormality non-display processing unit.

According to this configuration, the abnormality notification screen is not redisplayed on the display unit until the symbol is selected after the abnormal state is held and the abnormality notification screen becomes non-displayed. Accordingly, the abnormal state can be easily confirmed by the symbol being selected when necessary without the work that is performed by a worker being interrupted by redisplay of the abnormality notification screen, and thus the worker's workability is improved. In addition, the abnormality notification screen is not automatically redisplayed when the worker is absent, and thus another worker can be prevented from performing useless work.

The gas chromatograph may further include a gas flow rate control unit. The gas flow rate control unit controls a gas as an object of a gas leak abnormality so as to reach a flow rate at which the gas is not completely stopped in a case where the gas leak abnormality is detected as the abnormal state by the abnormality detection processing unit and the selection of the hold of the abnormal state is received by the input reception processing unit.

According to this configuration, in a case where the gas leak abnormality is detected as the abnormal state, the gas as the object of the gas leak abnormality continues to flow even after the abnormal state is held. As a result, the source of the leak of the gas as the object of the gas leak abnormality can be confirmed as it is, and thus the worker's workability can be improved.

Preferably, the gas flow rate control unit controls the flow rate of the gas as the object of the gas leak abnormality in a state where the abnormal state is held so as to reach a flow rate less than a flow rate during analysis.

According to this configuration, the flow rate of the gas as the object of the gas leak abnormality is kept below the flow rate during the analysis in a state where the gas leak abnormality is detected as the abnormal state and the abnormal state is held. As a result, the risk of explosion attributable to a gas leak or the like and useless gas consumption attributable to a gas leak can be suppressed.

The gas flow rate control unit may control the flow rate of the gas so as to reach a set flow rate in a case where setting of the flow rate of the gas as the object of the gas leak abnormality in a state where the abnormal state is held is received by the input reception processing unit.

According to this configuration, the flow rate of the gas as the object of the gas leak abnormality in a state where the abnormal state is held can be set to any flow rate. Accordingly, the flow rate of the gas in a state where the abnormal state is held can be appropriately set in view of the risk of explosion attributable to a gas leak or the like.

The gas flow rate control unit may completely stop a gas other than the gas as the object of the gas leak abnormality.

According to this configuration, useless gas consumption can be suppressed since the gas other than the object of the gas leak abnormality is completely stopped in a state where the abnormal state is held.

The gas chromatograph may further include a setting screen display processing unit. The setting screen display processing unit displays a setting screen of a control parameter of a part where the abnormal state has occurred on the display unit in a case where the abnormal state is detected by the abnormality detection processing unit and the selection of the hold of the abnormal state is received by the input reception processing unit.

According to this configuration, the worker can set the control parameter of the part where the abnormal state has occurred and can perform an operation with the control parameter in a state where the abnormal state is held. Accordingly, deterioration and expansion of the abnormal state can be suppressed by the part where the abnormal state has occurred being appropriately operated until the abnormal state is coped with.

According to the present invention, the abnormal state can be easily confirmed by the symbol being selected when necessary without the work that is performed by the worker being interrupted by redisplay of the abnormality notification screen, and thus the worker's workability is improved. In addition, according to the present invention, the abnormality notification screen is not automatically redisplayed when the worker is absent, and thus another worker can be prevented from performing useless work.

BRIEF DESCRIPTION

DETAILED DESCRIPTION

Figure 1:
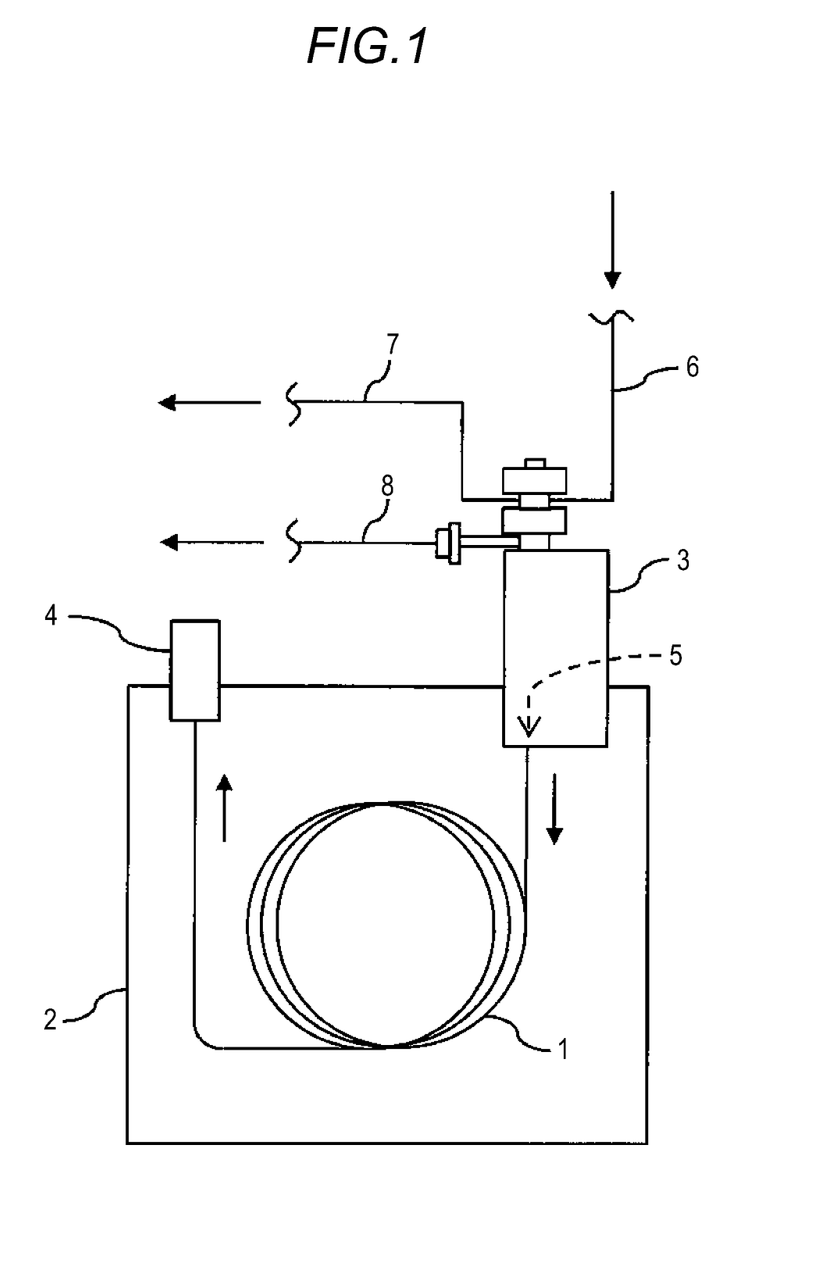
FIG. 1 is a schematic diagram illustrating a configuration example of a gas chromatograph according to an embodiment of the present invention.

FIG. 1 is a schematic diagram illustrating a configuration example of a gas chromatograph according to an embodiment of the present invention. The gas chromatograph is for performing analysis by supplying a sample gas along with a carrier gas into a column 1 and is provided with a column oven 2, a sample introduction portion 3, a detector 4, and so on in addition to the column 1.

The column 1 is composed of, for example, a capillary column and is heated in the column oven 2 during the analysis. The carrier gas is introduced into the column 1 along with the sample gas via a column entrance 5 from the sample introduction portion 3. A sample component contained in the sample gas is separated while passing through the column 1 and is detected by the detector 4. The detector 4 can be composed of various detectors such as a hydrogen flame ionization detector (FID).

The sample introduction portion 3 is for introducing the carrier gas and the sample gas into the column 1 from the column entrance 5, and a sample vaporization chamber (not illustrated) is formed in the sample introduction portion 3. A liquid sample is injected into the sample vaporization chamber, and the sample component vaporized in the sample vaporization chamber is introduced into the column 1 from the column entrance 5 along with the carrier gas. A gas supply flow path 6, a purge flow path 7, and a split flow path 8 communicate with the sample vaporization chamber.

The gas supply flow path 6 is a flow path for supplying the carrier gas into the sample vaporization chamber of the sample introduction portion 3. The purge flow path 7 is a flow path for discharging an undesired component generated from a septum or the like to the outside. The split flow path 8 is a flow path for discharging some of the gas in the sample vaporization chamber (mixed gas of the carrier gas and the sample gas) to the outside at a predetermined split ratio when the carrier gas and the sample gas are introduced into the column 1 from the column entrance 5 by a split introduction method.

Figure 2:
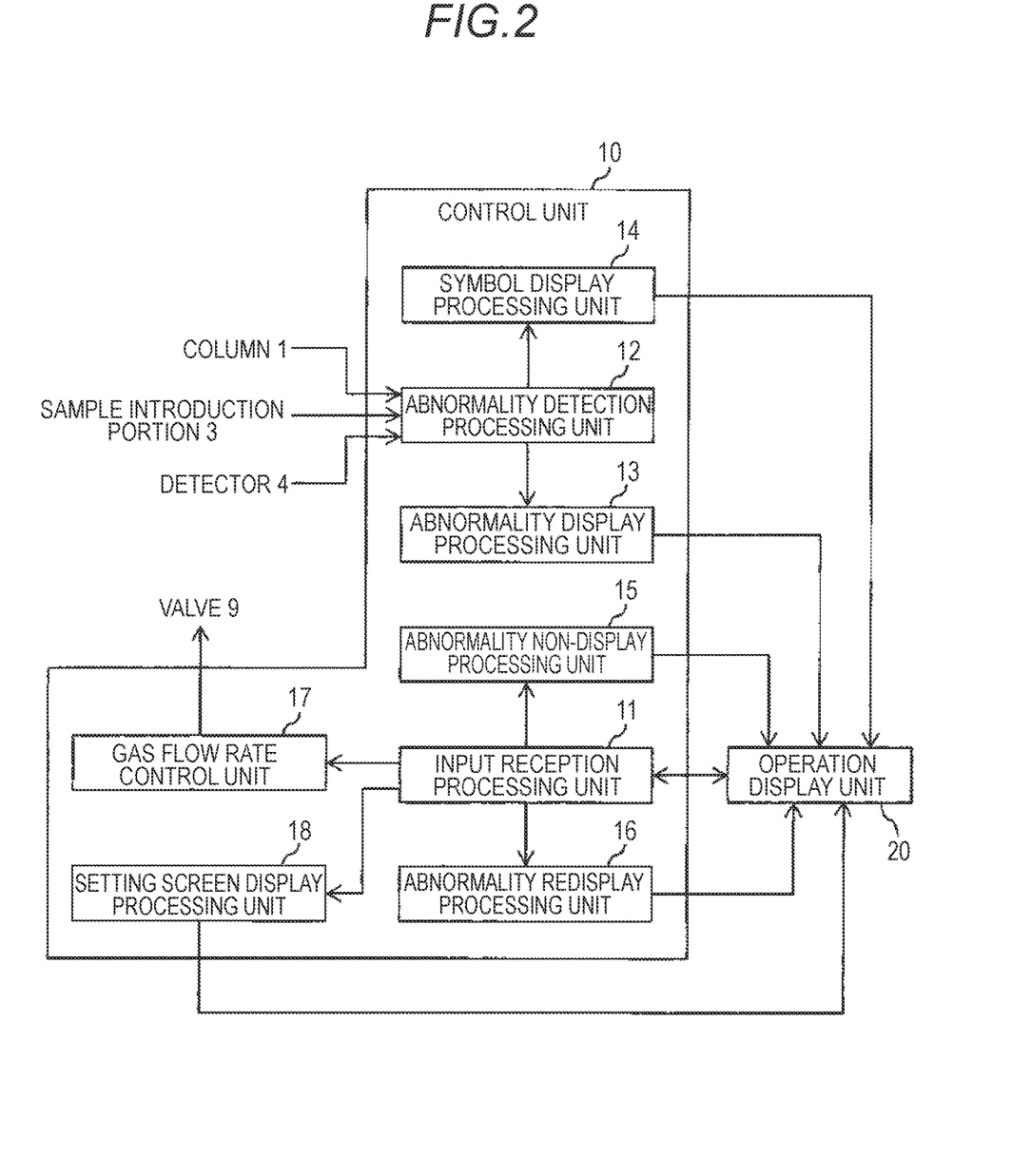
FIG. 2 is a block diagram illustrating an example of the electrical configuration of the gas chromatograph illustrated in FIG. 1.

FIG. 2 is a block diagram illustrating an example of the electrical configuration of the gas chromatograph illustrated in FIG. 1. An operation of the gas chromatograph is controlled by a control unit 10 including, for example, a central processing unit (CPU). An operation display unit 20 including, for example, a touch panel is connected to the control unit 10.

A worker can perform input relating to the operation of the gas chromatograph by performing an operation with respect to a display screen of the operation display unit 20 and can confirm information relating to the operation of the gas chromatograph displayed on the display screen of the operation display unit 20. The operation display unit 20 is attached to, for example, the main body of the gas chromatograph, and the worker can perform the confirmation of the information and the input operation while performing the analysis. Still, the present invention is not limited to the configuration in which the touch panel-type operation display unit 20 is disposed. The present invention may also be configured such that, for example, a display unit including a liquid crystal display and an operation unit including an operation key, a keyboard, a mouse, or the like are separately disposed.

The control unit 10 functions as an input reception processing unit 11, an abnormality detection processing unit 12, an abnormality display processing unit 13, a symbol display processing unit 14, an abnormality non-display processing unit 15, an abnormality redisplay processing unit 16, a gas flow rate control unit 17, a setting screen display processing unit 18, and so on by the CPU executing a program.

The input reception processing unit 11 performs processing for receiving the input operation in a case where the worker performs the operation with respect to the screen displayed on the operation display unit 20. The abnormality detection processing unit 12 detects an abnormal state of each portion of the gas chromatograph such as the column 1, the sample introduction portion 3, and the detector 4. The abnormal states include, for example, a temperature abnormality caused by a temperature exceeding a specified value and a control abnormality arising in an electrical circuit as well as a gas leak abnormality as a gas leak from a gas flow path. A gas other than the carrier gas is also included in the gas that is the object of the gas leak abnormality.

In a case where the abnormal state is detected by the abnormality detection processing unit 12, the abnormality display processing unit 13 performs processing for displaying an abnormality notification screen to that effect on the operation display unit 20. The abnormality notification screen includes detailed information on the content of the detected abnormal state, the part where the abnormal state has occurred, how to cope with the abnormal state, or the like. As a result, the worker can be notified of details of the abnormal state.

Figure 3A:
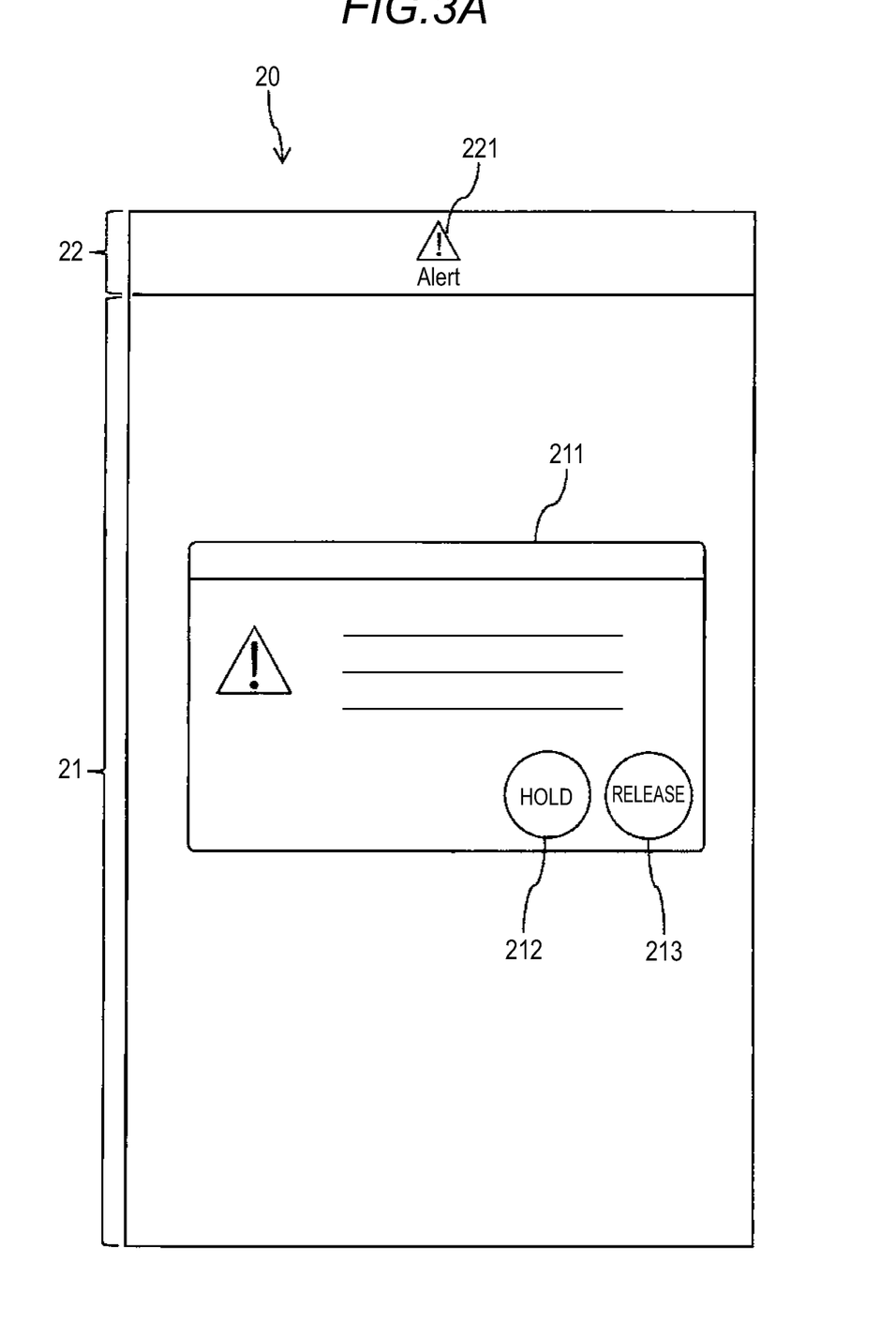
FIG. 3A is a diagram illustrating an example of the display mode of an operation display unit in a case where an abnormal state is detected.

FIG. 3A is a diagram illustrating an example of the display mode of the operation display unit 20 in a case where the abnormal state is detected. Various types of information are displayed on the operation display unit 20 divided into a basic display region 21 displaying various screens including, for example, the abnormality notification screen and a symbol display region 22 displaying a symbol such as an icon and a pattern.

A key that can be selected by the worker and so on are displayed in addition to character information in the basic display region 21, and thus the worker can be notified of the detailed information, the worker's intention can be confirmed, and so on. In the symbol display region 22, information relating to the status (operation state) of the gas chromatograph is displayed in the form of a symbol, and thus the worker can be notified of the status at that time in an easy-to-understand way in the small display region. The information displayed in the symbol display region 22 remains displayed at all times irrespective of the transition of the display in the basic display region 21.

In a case where the abnormal state is detected by the abnormality detection processing unit 12, an abnormality notification screen 211 is displayed in the basic display region 21 and a warning icon 221 as a symbol indicating that the abnormal state has occurred is displayed in the symbol display region 22 as illustrated in FIG. 3A. The abnormality notification screen 211 includes, for example, a hold key 212 and a release key 213 as well as the detailed information relating to the abnormal state as described above.

The hold key 212 is selected in a case where the worker holds the abnormal state, that is, in a case where the worker does not immediately cope with the abnormal state after the worker confirms the abnormality notification screen 211 displayed in the basic display region 21. The release key 213 is selected after the worker copes with the abnormal state displayed on the abnormality notification screen 211. The abnormality notification screen 211 displayed in the basic display region 21 becomes non-displayed in a case where either the hold key 212 or the release key 213 is selected.

In a case where the hold key 212 of the abnormality notification screen 211 is selected, the warning icon 221 displayed in the symbol display region 22 remains displayed. The worker can have the abnormality notification screen 211 redisplayed in the basic display region 21 by selecting the warning icon 221. In a case where the release key 213 of the abnormality notification screen 211 is selected, the warning icon 221 displayed in the symbol display region 22 becomes non-displayed.

Figure 3B:
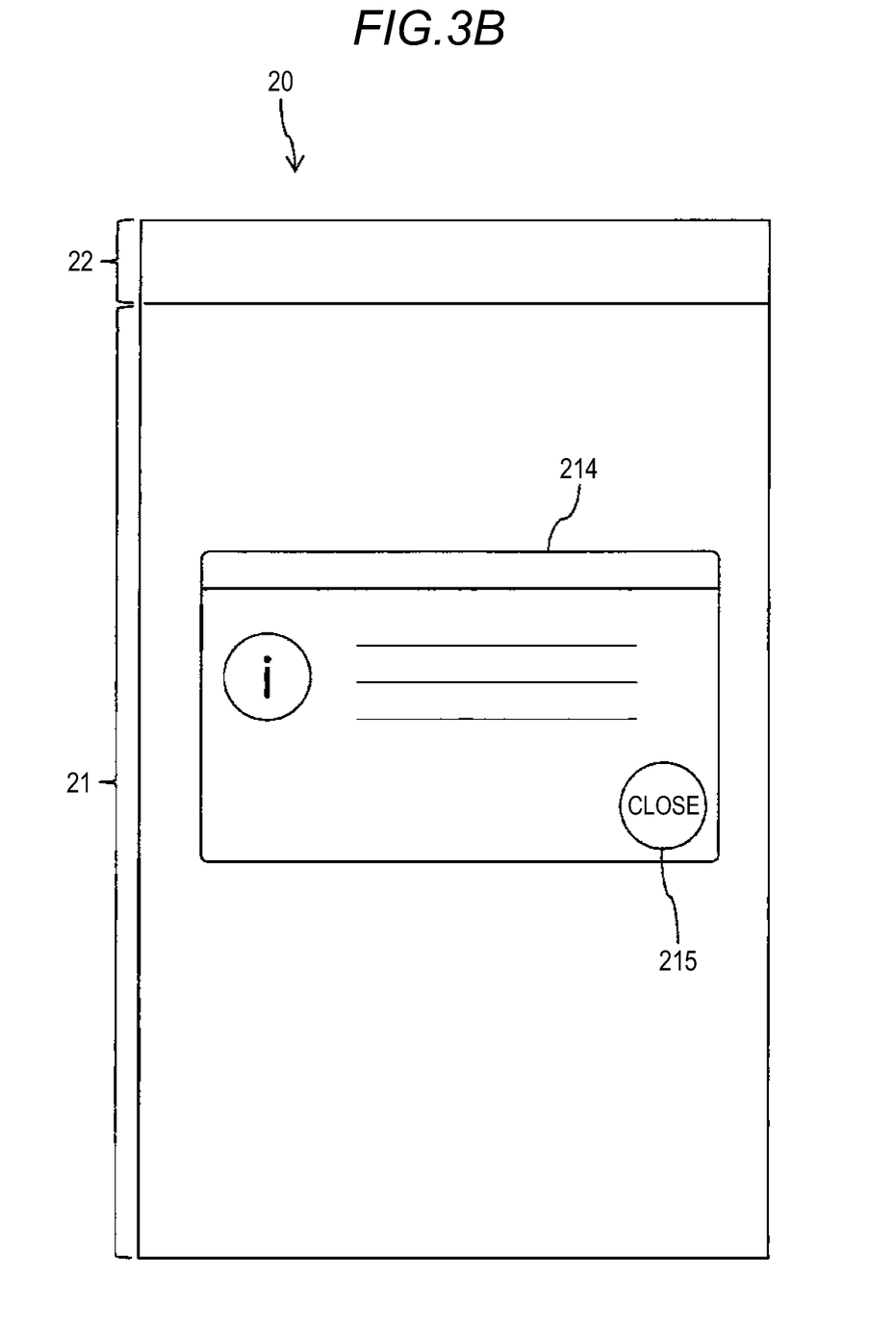
FIG. 3B is a diagram illustrating an example of the display mode of the operation display unit in a case where a release key is selected.

FIG. 3B is a diagram illustrating an example of the display mode of the operation display unit 20 in a case where the release key 213 is selected. In a case where the release key 213 is selected, the abnormality notification screen 211 displayed in the basic display region 21 and the warning icon 221 displayed in the symbol display region 22 become non-displayed and a release confirmation screen 214 is displayed in the basic display region 21 as illustrated in FIG. 3B.

The release confirmation screen 214 is a screen for the worker to confirm that the abnormal state has been released. The release confirmation screen 214 is displayed in, for example, a case where the release of the abnormal state is determined as a result of regular detection by the abnormality detection processing unit 12 as well as a case where the release key 213 (refer to FIG. 3A) of the abnormality notification screen 211 is selected by the worker coping with the abnormal state.

The release confirmation screen 214 includes, for example, a close key 215 as well as character information indicating the release of the abnormal state. The worker can have the release confirmation screen 214 non-displayed by selecting the close key 215 after confirming the release of the abnormal state from the character information displayed on the release confirmation screen 214.

Referring back to FIG. 2, the symbol display processing unit 14 performs processing for displaying a symbol on the operation display unit 20 and, in a case where the abnormal state is detected, the warning icon 221 to that effect is displayed on the operation display unit 20 (in the symbol display region 22). The abnormality non-display processing unit 15 performs processing for non-displaying the abnormality notification screen 211 in a case where the selection of the hold of the abnormal state is received by the input reception processing unit 11 in a state where the abnormality notification screen 211 is displayed on the operation display unit 20 (in the basic display region 21). The selection of the hold of the abnormal state is performed by, for example, the worker touching the hold key 212.

The abnormality redisplay processing unit 16 performs processing for redisplaying the abnormality notification screen 211 on the operation display unit 20 (in the basic display region 21) in a case where the selection of the warning icon 221 is received by the input reception processing unit after the abnormality notification screen 211 is non-displayed by the abnormality non-display processing unit 15. The selection of the warning icon 221 is performed by, for example, the worker touching the warning icon 221.

The gas flow rate control unit 17 individually controls the flow rates of gases flowing through a plurality of flow paths by controlling the opening and closing states of a plurality of valves 9 of the gas chromatograph. The plurality of flow paths includes, for example, various flow paths through which a gas other than the carrier gas flows as well as the gas supply flow path 6, the purge flow path 7, and the split flow path 8 through which the carrier gas flows.

The setting screen display processing unit 18 performs processing for displaying a setting screen for setting a parameter (control parameter) used when the operation of each portion of the gas chromatograph is controlled on the operation display unit 20. The setting screen is displayed in, for example, the basic display region 21 based on the operation that the worker performs on the operation display unit 20.

Figure 4:
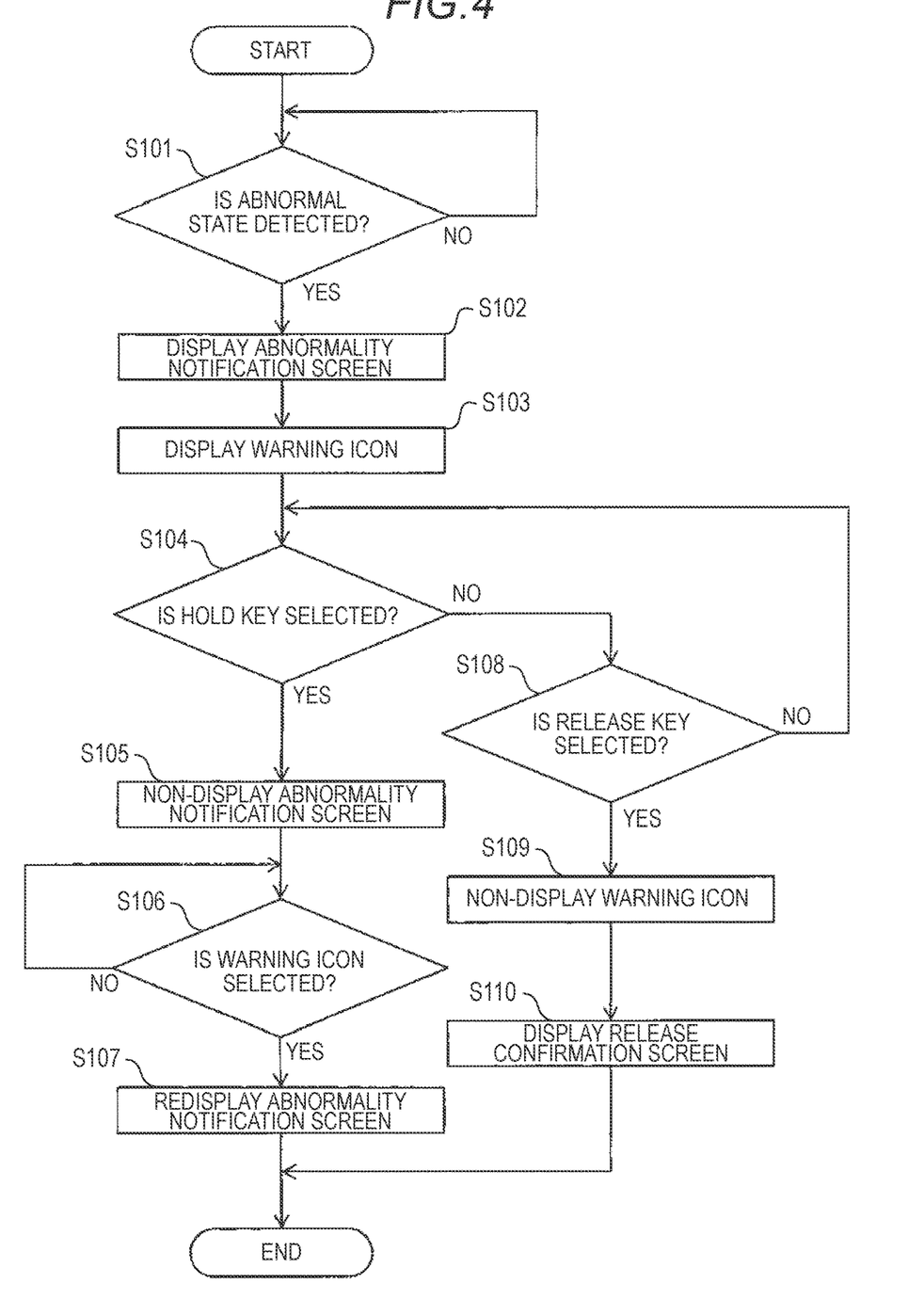
FIG. 4 is a flowchart illustrating an example of the processing that a control unit performs in a case where the abnormal state is detected.

FIG. 4 is a flowchart illustrating an example of the processing that the control unit 10 performs in a case where the abnormal state is detected. In a case where the abnormal state is detected by the abnormality detection processing unit 12 (Yes in Step S101), the abnormality notification screen 211 is displayed in the basic display region 21 by the abnormality display processing unit 13 (Step S102) and the warning icon 221 is displayed in the symbol display region 22 by the symbol display processing unit 14 (Step S103). In this case, the display mode of the operation display unit 20 becomes the state that is exemplified in FIG. 3A.

In a case where the hold key 212 included in the abnormality notification screen 211 is selected in this state (Yes in Step S104), the abnormality notification screen 211 is non-displayed by the abnormality non-display processing unit 15 (Step S105). At this time, the warning icon 221 displayed in the symbol display region 22 remains displayed.

In a case where the warning icon 221 is subsequently selected (Yes in Step S106), the abnormality notification screen 211 is redisplayed in the basic display region 21 by the abnormality redisplay processing unit 16 (Step S107). In this case, the display mode of the operation display unit 20 returns to the state that is exemplified in FIG. 3A.

In a case where the release key 213 is selected on the abnormality notification screen 211 displayed by the abnormality display processing unit 13 or the abnormality non-display processing unit 15 (Yes in Step S108), the warning icon 221 displayed in the symbol display region 22 becomes non-displayed (Step S109) and the release confirmation screen 214 is displayed in the basic display region 21 (Step S110). In this case, the display mode of the operation display unit 20 becomes the state that is exemplified in FIG. 3B.

As described above, in the present embodiment, the abnormality notification screen 211 is not redisplayed on the operation display unit 20 until the warning icon 221 is selected after the abnormal state is held and the abnormality notification screen 211 becomes non-displayed. Accordingly, the abnormal state can be easily confirmed by the warning icon 221 being selected when necessary without the work that is performed by the worker being interrupted by redisplay of the abnormality notification screen 211, and thus the worker's workability is improved. In addition, the abnormality notification screen 211 is not automatically redisplayed when the worker is absent, and thus another worker can be prevented from performing useless work.

The present invention is not limited to the configuration in which the warning icon 221 and the abnormality notification screen 211 are displayed at the same time on the operation display unit 20 in a case where the abnormal state is detected. For example, the warning icon 221 may also be displayed at another timing, examples of which include when the hold key 212 is selected. In addition, the present invention is not limited to the configuration in which the warning icon 221 is non-displayed when the release key 213 is selected. For example, the warning icon 221 may also be non-displayed at another timing, examples of which include when the close key 215 included in the release confirmation screen 214 is selected. A configuration in which the release confirmation screen 214 is not displayed is also possible.

Figure 5:
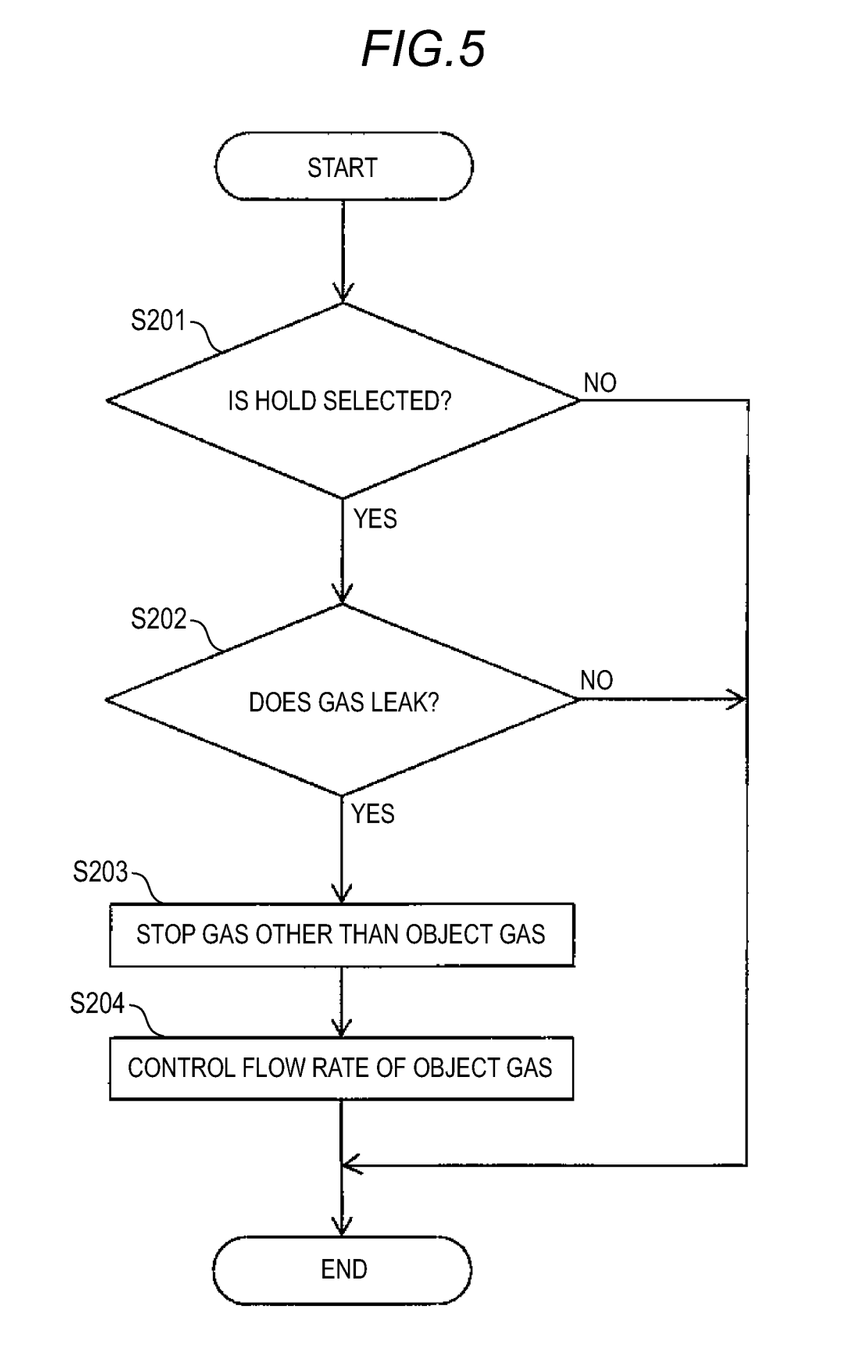
FIG. 5 is a flowchart illustrating an example of the processing that the control unit performs in a case where a hold key included in an abnormality notification screen is selected.

FIG. 5 is a flowchart illustrating an example of the processing that the control unit 10 performs in a case where the hold key 212 included in the abnormality notification screen 211 is selected. In this example, it is determined whether or not the abnormal state detected by the abnormality detection processing unit 12 is the gas leak abnormality (Step S202) in a case where the hold key 212 included in the abnormality notification screen 211 is selected (Yes in Step S201). In a case where the abnormal state at this time is the gas leak abnormality, the flow path where the gas leak abnormality has occurred can be identified based on, for example, detection signals from pressure sensors respectively disposed on the plurality of gas flow paths.

In a case where the detected abnormal state is the gas leak abnormality (Yes in Step S202), the gas other than the gas that is the object of the gas leak abnormality (object gas) is completely stopped by the gas flow rate control unit 17 controlling the opening and closing states of the plurality of valves 9 (Step S203). Meanwhile, the gas flow rate control unit 17 does not completely stop the object gas and controls the flow rate of the object gas so as to reach a predetermined flow rate determined in advance (Step S204).

In this manner, in a case where the gas leak abnormality is detected as the abnormal state, the object gas continues to flow even after the abnormal state is held. As a result, the worker can confirm the source of the object gas leak as it is by using, for example, a device for gas leak detection, and thus the worker's workability can be improved. In addition, useless gas consumption can be suppressed since the gas other than the object gas is completely stopped in a state where the abnormal state is held.

The present invention is not limited to the configuration in which the gas other than the object gas is completely stopped and the object gas is controlled so as to reach the predetermined flow rate in a case where the hold key 212 included in the abnormality notification screen 211 is selected. The present invention may also be configured such that, for example, the gas other than the object gas is completely stopped and the object gas is controlled so as to reach the predetermined flow rate in a case where a permission key (not illustrated) is displayed on the abnormality notification screen 211 and the permission key is selected.

The flow rate of the object gas in a state where the gas leak abnormality is held may be a fixed value or may be capable of being set to any value by the worker operating the operation display unit 20. In a case where the flow rate of the object gas is a fixed value, it is preferable that the fixed value is a flow rate less than the flow rate of the object gas during the analysis. In this case, the flow rate of the object gas is kept below the flow rate during the analysis in a state where the gas leak abnormality is held, and thus the risk of explosion attributable to a gas leak or the like and useless gas consumption attributable to a gas leak can be suppressed.

In a case where the worker sets the flow rate of the object gas by using the operation display unit 20 and the setting is received by the input reception processing unit 11 as a result, the gas flow rate control unit 17 controls the flow rate of the object gas so as to reach the set flow rate. Insofar as the flow rate of the object gas in a state where the gas leak abnormality is held can be set to any flow rate as described above, the flow rate of the object gas in a state where the gas leak abnormality is held can be appropriately set in view of the risk of explosion attributable to a gas leak or the like.

Figure 6:
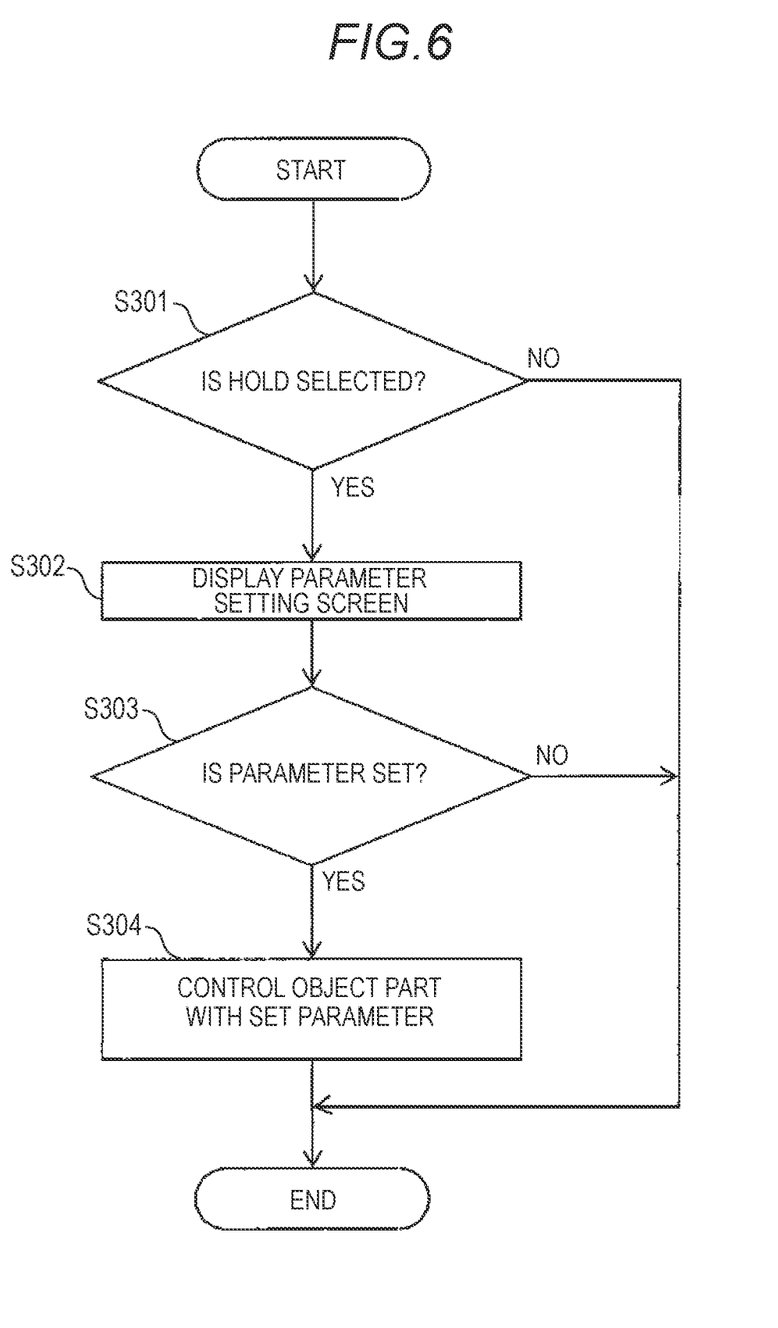
FIG. 6 is a flowchart illustrating another example of the processing that the control unit performs in a case where the hold key included in the abnormality notification screen is selected.

FIG. 6 is a flowchart illustrating another example of the processing that the control unit 10 performs in a case where the hold key 212 included in the abnormality notification screen 211 is selected. In this example, the setting screen (parameter setting screen) for setting the control parameter of the part where the abnormal state has occurred is displayed on the operation display unit 20 by the setting screen display processing unit 18 (Step S302) in a case where the hold key 212 included in the abnormality notification screen 211 is selected (Yes in Step S301).

The abnormal state in this case includes various other abnormal states such as the temperature abnormality and the control abnormality as well as the gas leak abnormality. At this time, the part where the abnormal state has occurred can be identified based on detection signals from various sensors of the gas chromatograph such as the pressure sensor and a temperature sensor.

In a case where the control parameter setting is performed on the parameter setting screen by the worker operating the operation display unit 20 (Yes in Step S303), the part where the abnormal state has occurred is controlled with the set control parameter (Step S304). In this manner, the worker can set the control parameter of the part where the abnormal state has occurred and can perform an operation with the control parameter in a state where the abnormal state is held. Accordingly, deterioration and expansion of the abnormal state can be suppressed by the part where the abnormal state has occurred being appropriately operated until the abnormal state is coped with.

Although a configuration in which a liquid sample is vaporized in the sample introduction portion 3 has been described in the embodiment above, the present invention is not limited to the configuration and a sample gas vaporized in advance may be supplied into the sample introduction portion 3 instead. In this case, a configuration in which a sample vaporization chamber is formed in the sample introduction portion 3 is optional.

Although the gas chromatograph according to the embodiment above is provided with the purge flow path 7 and the split flow path 8, the present invention is not limited thereto. Any one of the flow paths may be omitted with the other flow path communicating with the sample vaporization chamber. Furthermore, the present invention is also applicable to a gas chromatograph mass analysis device in which a mass analysis device is connected to a gas chromatograph.

The invention claimed is:

1. A gas chromatograph comprising:
a display unit;
an input reception processing unit for receiving an input operation with respect to a screen displayed on the display unit;
an abnormality detection processing unit for detecting an abnormal state;
an abnormality display processing unit for displaying an abnormality notification screen indicating abnormal state detection on the display unit in a case where the abnormal state is detected;
an abnormality non-display processing unit for not displaying the abnormality notification screen on the display unit in a case where selection of a hold of the abnormal state is received by the input reception processing unit in a state where the abnormality notification screen is displayed on the display unit;
a symbol display processing unit for displaying a symbol indicating the abnormal state detection on the display unit;
an abnormality redisplay processing unit for redisplaying the abnormality notification screen on the display unit in a case where selection of the symbol is received by the input reception processing unit after the abnormality notification screen is not displayed on the display unit by the abnormality non-display processing unit; and
a gas flow rate control unit for controlling a flow rate of a gas, wherein the flow rate of the gas is not completely stopped by the gas flow rate control unit in a case where a gas leak abnormality is detected as the abnormal state by the abnormality detection processing unit and the selection of the hold of the abnormal state is received by the input reception processing unit.

2. The gas chromatograph according to claim 1, wherein, in the case where the gas leak abnormality is detected as the abnormal state by the abnormality detection processing unit and the selection of the hold of the abnormal state is received by the input reception processing unit, the gas flow rate control unit sets the flow rate of the gas to a flow rate that is less than a flow rate during analysis.

3. The gas chromatograph according to claim 1, wherein, in the case where the gas leak abnormality is detected as the abnormal state by the abnormality detection processing unit and the selection of the hold of the abnormal state is received by the input reception processing unit, the gas flow rate control unit sets the flow rate of the gas to a set flow rate.

4. The gas chromatograph according to claim 1, wherein, the gas is a first gas and, in the case where the gas leak abnormality is detected as the abnormal state by the abnormality detection processing unit, the gas flow rate control unit completely stops a flow of a second.

5. The gas chromatograph according to claim 1, further comprising a setting screen display processing unit for displaying a setting screen of a control parameter, wherein, in the case where the abnormal state is detected by the abnormality detection processing unit and the selection of the hold of the abnormal state is received by the input reception processing unit, the setting screen display processing unit displays the setting screen.

6. The gas chromatograph according to claim 1 wherein the abnormality non-display processing unit is for not displaying the abnormality notification screen on the display unit in a case where selection of a hold key included in the abnormality notification screen is received by the input reception processing unit in a state where the abnormality notification screen is displayed on the display unit.

7. The gas chromatograph according to claim 1, wherein the symbol display processing unit is for displaying the symbol indicating the abnormal state detection with the abnormality notification screen on the display unit.

* * * * *